United States Patent
Friedlander et al.

(10) Patent No.: US 9,146,112 B2
(45) Date of Patent: *Sep. 29, 2015

(54) MOBILITY ROUTE OPTIMIZATION

(71) Applicant: INTERNATIONAL BUSINESS MACHINES CORPORATION, Armonk, NY (US)

(72) Inventors: Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 197 days.

This patent is subject to a terminal disclaimer.

(21) Appl. No.: 13/947,526

(22) Filed: Jul. 22, 2013

(65) Prior Publication Data

US 2013/0311088 A1 Nov. 21, 2013

Related U.S. Application Data

(63) Continuation-in-part of application No. 13/252,342, filed on Oct. 4, 2011.

(51) Int. Cl.
*G01C 21/00* (2006.01)
*G01C 21/34* (2006.01)
(Continued)

(52) U.S. Cl.
CPC .............. *G01C 21/00* (2013.01); *G01C 21/20* (2013.01); *G01C 21/34* (2013.01); *G01C 21/3484* (2013.01); *A61H 3/02* (2013.01); *A61H 3/061* (2013.01); *A61H 3/068* (2013.01);
(Continued)

(58) Field of Classification Search
CPC .... G01C 21/00; G01C 21/20; G01C 21/3492; G01C 21/3484; G01C 21/34; A61H 3/02; A61H 3/061; A61H 3/068; A61H 2201/5097; A61H 2201/5007; A61H 2201/5012; A61H 2201/5015; A61H 2201/5043; A61H 2201/5064
USPC .......................... 701/408, 433, 516, 517, 527
See application file for complete search history.

(56) References Cited

U.S. PATENT DOCUMENTS

| | | | |
|---|---|---|---|
| 3,820,381 | A | 6/1974 | Thurston |
| 3,838,421 | A | 9/1974 | Dasse-Hartaut et al. |

(Continued)

FOREIGN PATENT DOCUMENTS

| | | | |
|---|---|---|---|
| JP | 52104960 | A | 9/1977 |
| JP | 4235380 | A | 8/1992 |

(Continued)

OTHER PUBLICATIONS

U.S. Appl. No. 13/962,665—Non-Final Office Action Mailed September 27, 2013, pp. 1-6.

(Continued)

*Primary Examiner* — Russell Frejd
(74) *Attorney, Agent, or Firm* — Law Office of Jim Boice

(57) ABSTRACT

A processor-implemented method, system, and/or computer program product guides mobility-impaired pedestrians. Mobile tracking readings are received from multiple mobility assistance devices, each of which has an affixed tracking device. Based on these mobile tracking readings, multiple pedestrian routes for mobility-impaired pedestrians, including an optimal pedestrian route that has the highest tracking history to a desired destination, are generated.

13 Claims, 4 Drawing Sheets

(51) Int. Cl.
  *G01C 21/20* (2006.01)
  *A61H 3/02* (2006.01)
  *A61H 3/06* (2006.01)

(52) U.S. Cl.
  CPC . *A61H2201/5007* (2013.01); *A61H 2201/5012* (2013.01); *A61H 2201/5015* (2013.01); *A61H 2201/5043* (2013.01); *A61H 2201/5064* (2013.01); *A61H 2201/5097* (2013.01); *G01C 21/3492* (2013.01)

(56) References Cited

U.S. PATENT DOCUMENTS

| | | | |
|---|---|---|---|
| 4,073,183 A | 2/1978 | Byalko et al. | |
| 4,186,590 A | 2/1980 | Egorov et al. | |
| 4,511,247 A | 4/1985 | McGovern et al. | |
| 4,530,233 A | 7/1985 | Kadi | |
| 4,715,743 A * | 12/1987 | Schmanski | 404/9 |
| 5,195,046 A | 3/1993 | Gerardi et al. | |
| 5,549,803 A | 8/1996 | Schoess et al. | |
| 5,681,986 A | 10/1997 | Merk et al. | |
| 5,736,940 A | 4/1998 | Burgener | |
| 6,260,004 B1 | 7/2001 | Hays et al. | |
| 6,265,979 B1 | 7/2001 | Chen et al. | |
| 6,718,270 B2 | 4/2004 | Horiuchi et al. | |
| 6,731,804 B1 | 5/2004 | Carrieri et al. | |
| 6,950,767 B2 | 9/2005 | Yamashita et al. | |
| 7,228,740 B2 | 6/2007 | Sinha | |
| 7,325,759 B2 | 2/2008 | Meyer | |
| 7,343,136 B2 | 3/2008 | Liu et al. | |
| 7,535,355 B2 | 5/2009 | Barone | |
| 7,627,441 B2 | 12/2009 | Longsdorf et al. | |
| 7,630,948 B2 | 12/2009 | Friedlander et al. | |
| 7,693,663 B2 | 4/2010 | Friedlander et al. | |
| 7,720,574 B1 | 5/2010 | Roys | |
| 7,762,142 B2 | 7/2010 | Rakow et al. | |
| 8,154,723 B2 | 4/2012 | Fu et al. | |
| 8,538,667 B2 | 9/2013 | Friedlander et al. | |
| 2002/0077749 A1 | 6/2002 | Doi | |
| 2004/0122787 A1 | 6/2004 | Avinash et al. | |
| 2005/0011278 A1 | 1/2005 | Brown et al. | |
| 2005/0256885 A1 | 11/2005 | Yairi et al. | |
| 2006/0071786 A1 | 4/2006 | Fano | |
| 2006/0097983 A1 | 5/2006 | Haggman et al. | |
| 2006/0285350 A1 | 12/2006 | Wang | |
| 2007/0050121 A1 | 3/2007 | Ammon et al. | |
| 2007/0199382 A1 | 8/2007 | Sakai | |
| 2008/0009099 A1 | 1/2008 | Kishkovich et al. | |
| 2008/0077463 A1 | 3/2008 | Friedlander et al. | |
| 2008/0180281 A1 | 7/2008 | Bilimoria et al. | |
| 2008/0270034 A1 | 10/2008 | Friedlander et al. | |
| 2008/0274553 A1 | 11/2008 | Bratton et al. | |
| 2009/0157302 A1 | 6/2009 | Tashev et al. | |
| 2009/0271100 A1 | 10/2009 | Kim et al. | |
| 2010/0125409 A1 | 5/2010 | Prehofer | |
| 2010/0150359 A1 | 6/2010 | Knickrehm et al. | |
| 2010/0189291 A1 | 7/2010 | Aharoni et al. | |
| 2010/0268469 A1 | 10/2010 | Harrison et al. | |
| 2011/0085156 A1 | 4/2011 | Jones et al. | |
| 2011/0130956 A1 | 6/2011 | Tracton et al. | |
| 2011/0153193 A1 | 6/2011 | Fox et al. | |
| 2011/0153208 A1 | 6/2011 | Kruglick | |
| 2011/0172907 A1* | 7/2011 | Rui Da Silva Freitas | 701/201 |
| 2011/0173067 A1 | 7/2011 | Herbst et al. | |
| 2011/0238291 A1 | 9/2011 | Bach | |
| 2011/0308638 A1 | 12/2011 | Hyland et al. | |
| 2013/0030613 A1 | 1/2013 | Friedlander et al. | |
| 2013/0030680 A1 | 1/2013 | Friedlander et al. | |
| 2013/0030724 A1 | 1/2013 | Friedlander et al. | |
| 2013/0030725 A1 | 1/2013 | Friedlander et al. | |
| 2013/0040399 A1 | 2/2013 | Belbruno et al. | |
| 2013/0085671 A1 | 4/2013 | Friedlander et al. | |

FOREIGN PATENT DOCUMENTS

| | | | |
|---|---|---|---|
| JP | 05052972 U | | 7/1993 |
| JP | 07044117 A | | 2/1995 |
| JP | 08085496 A | | 4/1996 |
| JP | 2006194795 A | | 7/2006 |
| JP | 2007531868 A | | 11/2007 |
| WO | 2008052786 A1 | | 5/2008 |
| WO | 2010071607 A1 | | 6/2010 |

OTHER PUBLICATIONS

U.S. Appl. No. 13/192,149—Non-Final Office Action Mailed September 27, 2013, pp. 1-19.
U.S. Appl. No. 13/190,172—Non-Final Office Action Mailed September 25, 2013, pp. 1-26.
U.S. Appl. No. 13/962,665—Notice of Allowance Mailed January 3, 2014, pp. 1-14.
U.S. Appl. No. 13/192,149—Final Office Action Mailed February 26, 2014, pp. 1-34.
N. Harrington, "Knock-Based Commands for Your Linux Laptop", Jul. 25, 2006, http://www.ibm.com/developerworks/library/l-knock-age/index.html, pp. 1-14.
W. Xie et al., "A New Diagnostic Method of Bolt Loosening Detection for Thermal Protection Systems", Proceedings of the SPIE—The International Society for Optical Engineering, vol. 7493, 2009, pp . 1-2.
S. Lihua et al., "Applications of Piezoelectric Material Sensors in Smart Structures", Transactions of Nanjing University of Aeronautics & Astronautics, vol. 1, No. 2, 210-213, Dec. 1996.
J. Schoess et al., "Smart Aircraft Fastener Evaluation (SAFE) System—A Condition-Based Corrosion Detection System for Aging Aircraft", Proceedings of the SPIE—The International Society for Optical Engineering, vol. 2718, 175-184, 1996.
J. Schoess et al., "Smart Fastener for KC-135 Structural Integrity Monitoring", Proceedings of the SPIE —The International Society for Optical Engineering, vol. 3042, pp. 278-282, 1997.
T. Bojko, "Smart Sensor Solutions for Mechanical Measurements and Diagnostics", Metrology and Measurement Systems, vol. 12, No. 1, 2005, pp. 95-103.
S. Kessler, "Piezoelectric-Based In-Situ Damage Detection of Composite Materials for Structural Health Monitoring Systems", Doctorate of Philosophy in Aeronautics and Astronautics at the Massachusetts Institute of Technology, 2002, pp. 1-200.
D. Sinha, "Acoustic Sensor for Pipeline Monitoring: Technology Report", Los Alamos National Laboratory, Jul. 20, 2005, pp. 1-23.
B. Umeadi et al., "The Development of an Intelligent Sensor for the Monitoring of Pipeline System Integrity", Oil and Gas 2008, pp. 1-4.
C. Zang et al., "Structural Health Monitoring and Damage Assessment Using Frequency Response Correlation Criteria", Journal of Engineering Mechanics, Sep. 2007, 981-993.
S.L. Hung et al., "Aiming for the Top University Plan: Preliminary Results" 2009, http://www.cv.nctu.edu.tw/~wwwadm/chinese/monitoring2/result.html, 1 page.
U.S. Appl. No. 11/741,186, Friedlander et al.—Non-Final Office Action Mailed Nov. 21, 2008, pp. 1-17.
U.S. Appl. No. 11/741,186, Friedlander et al.—Final Office Action Mailed Apr. 15, 2009, pp. 1-6.
U.S. Appl. No. 11/741,186, Friedlander et al.—Non-Final Office Action Mailed Jul. 9, 2009, pp. 1-26.
U.S. Appl. No. 11/741,186, Friedlander et al.—Notice of Allowance Mailed Nov. 20, 2009, pp. 1-15.
R. Marinelli, "FAA Runway Friction Program", Runway Condition Determination, Reporting, and Report Dissemination Workshop, Jun. 20, 2006, pp. 1-14.
T. Yager, "Runway Friction Measurement", FAA/Aviation Industry Workshop on Runway Condition Determination, Reporting, and Report Dissemination, Aug. 7-8, 2006, pp. 1-15.
Douglas Equipment International Inc., Special Products Division "MU-Meter MK 6-Specification" PDF Retrieved From http://www.

(56) References Cited

OTHER PUBLICATIONS douglas-equipment.com/product_display.php?id=0000000035, pp. 1-2.

U.S. Appl. No. 13/192,887—Non-Final Office Action Mailed Feb. 7, 2013, pp. 1-18.

United Kingdom Patent Application No. GB1216790.4, Combined Search and Examination Report, Jan. 18, 2013, pp. 1-5.

International Searching Authority, International Search Report and Written Opinion for PCT/IB2012/053753, Dec. 18, 2012, pp. 1-6.

U.S. Appl. No. 13/252,342—Non-Final Office Action Mailed Nov. 9, 2012, pp. 1-15.

UK IPO, GB Patent Application No. 1401834.5—Examination Report Mailed Mar. 18, 2014, pp. 1-4.

U.S. Appl. No. 14/155,781—Non-Final Office Action mailed Apr. 17, 2015.

* cited by examiner

MOBILITY ROUTE OPTIMIZATION

The present application is a continuation in part of U.S. Patent Publication No. 2013-0085671, filed on Oct. 4, 2011, and entitled, "Mobility Route Optimization," which is incorporated herein by reference.

BACKGROUND

The present disclosure relates to the field of computers and tracking sensors, and specifically to the use of computers and tracking sensors in the field of pedestrian navigation. Still more particularly, the present disclosure relates to the use of computers and tracking sensors in providing suggested pedestrian routes to mobility-impaired users.

Accessibility to public facilities and buildings can often be challenging to pedestrians that are mobility-impaired. A mobility-impaired pedestrian is a person who has physical or other conditions that impede mobility. Such mobility-impaired persons experience unique challenges when traversing across unfamiliar landscapes to reach a desired destination.

SUMMARY

A processor-implemented method, system, and/or computer program product guides mobility-impaired pedestrians. Mobile tracking readings are received from multiple mobility assistance devices, each of which has an affixed tracking device. Based on these mobile tracking readings, multiple pedestrian routes for mobility-impaired pedestrians, including an optimal pedestrian route that has the highest tracking history to a desired destination, are generated.

DETAILED DESCRIPTION

Figure 1:
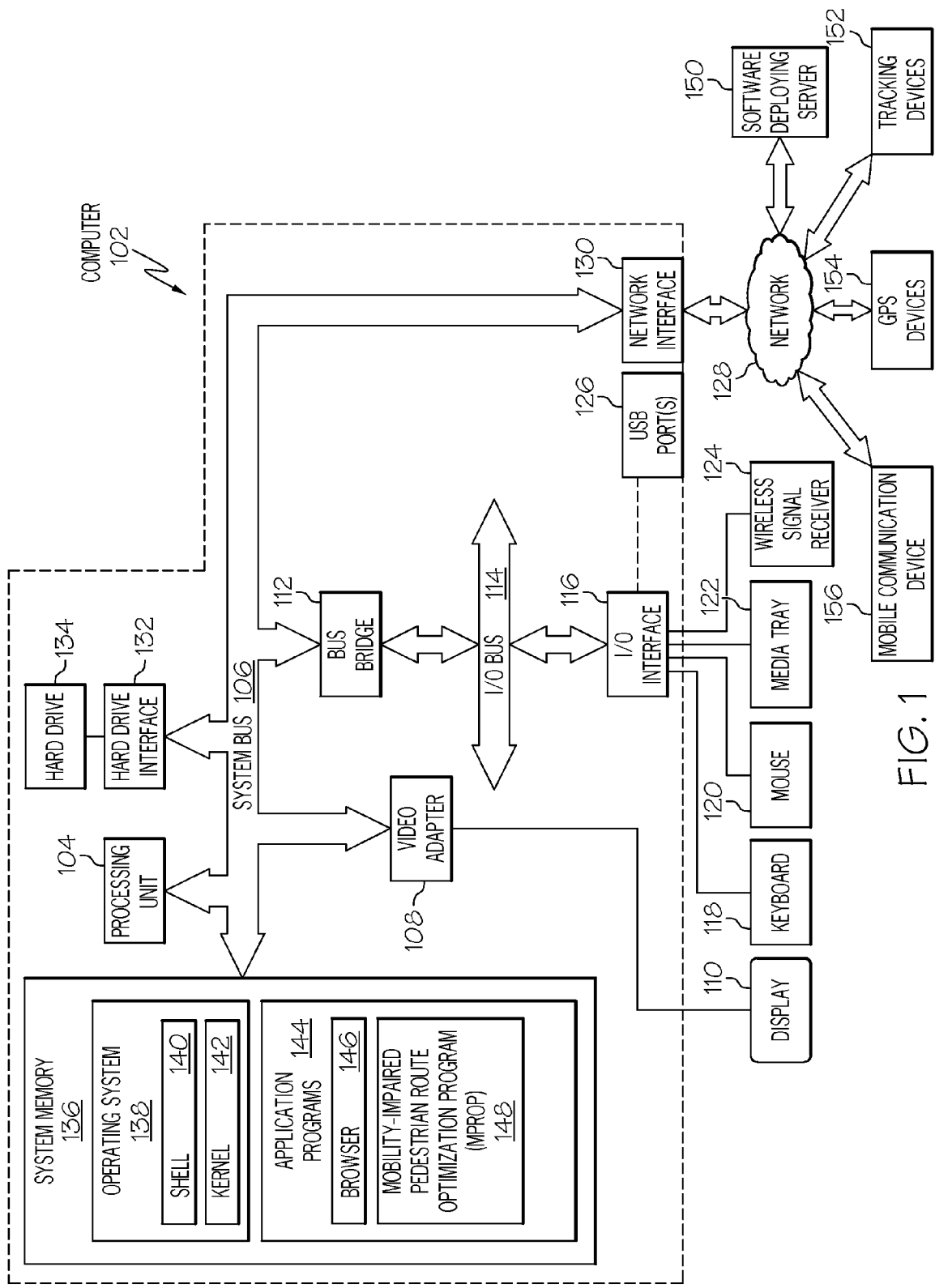
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150, tracking devices 152, Global Positioning System (GPS) devices 154, and/or mobile communication device 156 shown in FIG. 1, and/or local processing/transmitting system 202, tracking device 252, and/or GPS device 254 shown in FIG. 2.

Computer 102 includes a processing unit 104 that is coupled to a system bus 106. Processing unit 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a wireless signal receiver 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (and, in one embodiment, software deploying server 150's system memory) also include a mobility-impaired pedestrian route optimization program (MPROP) 148. MPROP 148 includes code for implementing the processes described below, including those described in FIGS. 2-4. In one embodiment, computer 102 is able to download MPROP 148 from software deploying server 150, including in an on-demand basis, wherein the code in MPROP 148 is not downloaded until needed for execution. Note further that, in one embodiment of the present invention, software deploying server 150 performs all of the functions associated with the present invention (including execution of MPROP 148), thus freeing computer 102 from having to use its own internal computing resources to execute MPROP 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
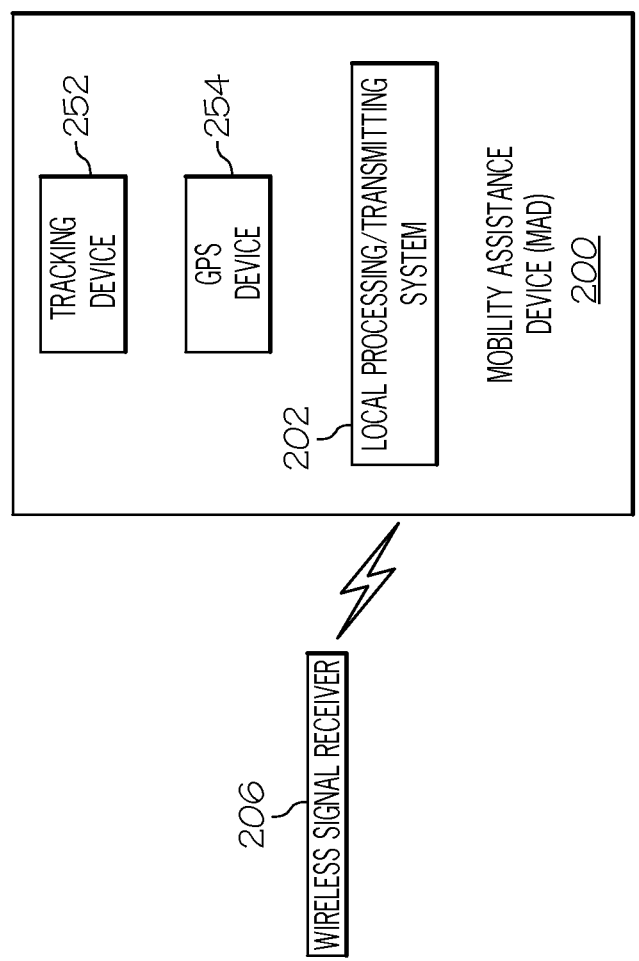
FIG. 2 illustrates an exemplary mobile assistance device to which a tracking device is affixed.

With reference now to FIG. 2, an exemplary mobile assistance device (MAD) 200, to which a tracking device 252 (analogous to one of the tracking devices 152 depicted in FIG. 1) is affixed, is presented. MAD 200 is any assistance device used to aid a mobility-impaired pedestrian. As used herein, a mobility-impaired pedestrian is defined as a person who has a physical and/or emotional condition that limits his ability to be locomotive. Examples of such physical/emotional conditions include, but are not limited to, loss of or loss of use of one or more extremities, low vision or total blindness in one or both eyes, reduced hearing or total deafness in one or both ears, emotional issues such as anxiety or chronic disorientation that prevent traversal across certain routes due to environmental issues, stamina issues causes by decreased heart/lung capacity, etc. Examples of a MAD 200 include, but are not limited to, a wheelchair, crutches, a support cane, a "white" cane used by the blind, a cast worn by the pedestrian, etc. The tracking device 252, when used in conjunction with a location determining device such as the global positioning system (GPS) device 254 (analogous to one of GPS devices 154 shown in FIG. 1), is able to send out location signals to a wireless signal receiver 206 (e.g., the wireless signal receiver 124 shown in FIG. 1). These location signals may be remotely processed (e.g., by computer 102 shown in FIG. 1) or locally processed (e.g., by local processing system 202). In either embodiment, the tracking device 252 generates a plurality of mobile tracking readings that describe where (and optionally when) the MAD 200 has been. In one embodiment, the mobile tracking readings are transmitted every predetermined period of time (e.g., every 60 seconds). In another embodiment, the mobile tracking readings are transmitted continuously.

Figure 3:
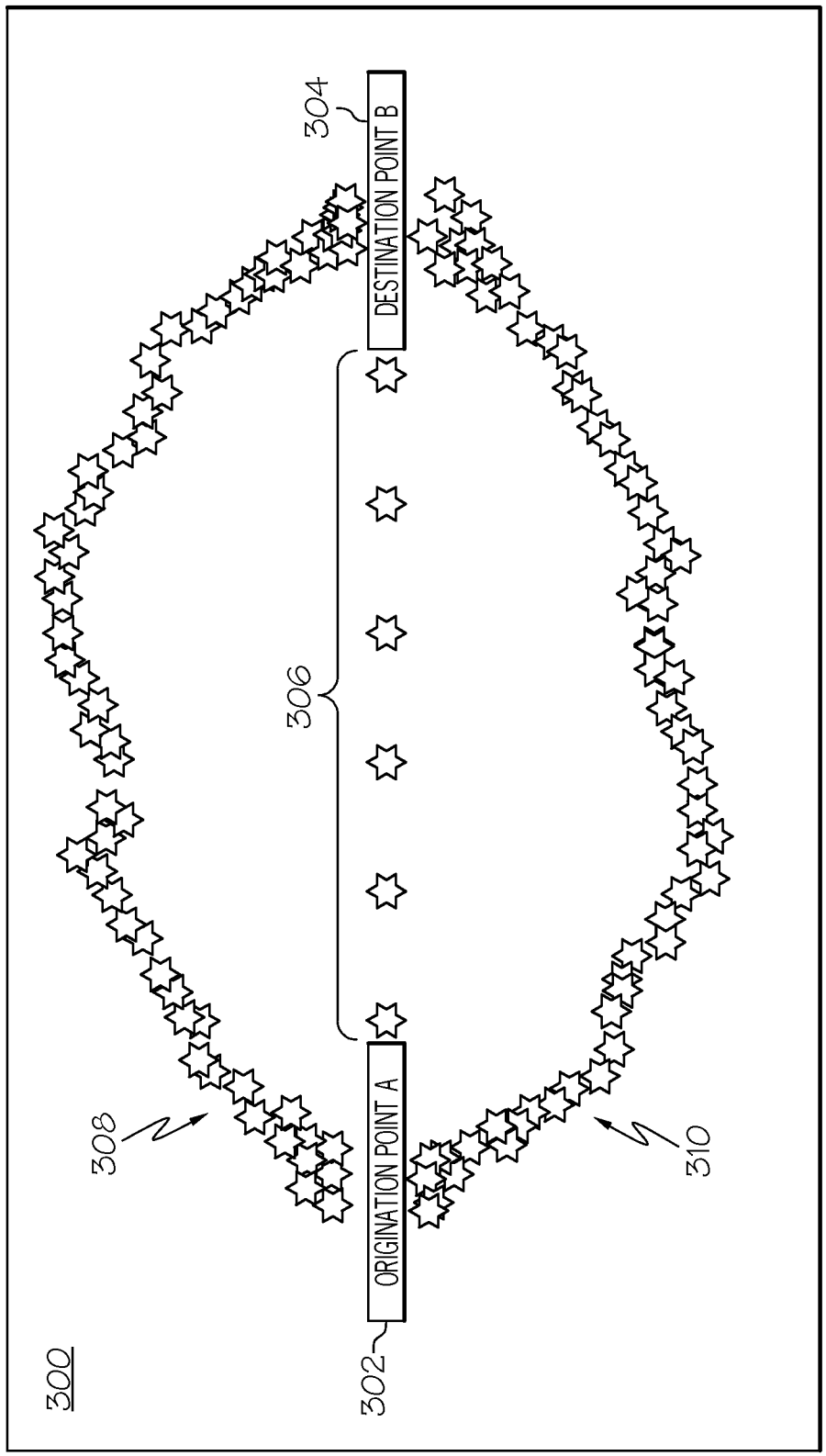
FIG. 3 depicts multiple exemplary pedestrian routes generated by readings from tracking devices on multiple mobile assistance devices.

As depicted in FIG. 3, these mobile tracking readings are plotted on a map 300, which shows an origination point A (302), a destination point B (304), and pedestrian routes 306, 308, and 310 that are represented by the mobile tracking readings from the signals generated by the tracking device. Note that map 300 is a plot of multiple MAD 200s. Assume that the tracking device 252 in each of the multiple MAD 200s emits a location signal every 60 seconds. The high number of tracking points in pedestrian routes 308 and 310 indicate that these routes have a history of many MAD 200s following these routes, while the dearth of tracking points for pedestrian route 306 indicates that relatively few MAD 200s have taken this route, even though it is the shortest route between the origination point A and the destination point B. The present invention takes advantage of the historical trends shown to identify the optimal routes between point A and point B. That is, since map 300 shows that most mobility-impaired pedestrians (using MAD 200s) took pedestrian routes 308 or 310, then an assumption is made that these are the best routes for a current mobility-impaired pedestrian to take.

Note that pedestrian route 308 and pedestrian route 310 have a substantially similar number of tracking points. This similarity may be due to simple randomness, in which both routes are equally optimal (i.e., have the easiest sidewalks, pathways, fields, etc. to cross in a wheelchair or when on crutches), and past users have randomly chosen which route to take. In one embodiment, however, data analysis reveals that when it is snowing, raining, dark, etc., most mobility-impaired pedestrians will choose pedestrian route 308 (e.g., due to paved pathways, good lighting, etc.), but when the weather is clear during daytime hours, most mobility-impaired pedestrians will choose pedestrian route 310 (e.g., due to nicer scenery, proximity to popular coffee shops, etc.). Thus, in one embodiment a processor first correlates when the tracking points were taken to historical data from a local weather service. This historical data reveals what the local weather conditions (e.g., snowing, raining, etc.) were when the tracking points were taken. Based on this revelation/correlation, the processor is able to identify the most popular pedestrian routes according to current weather conditions. Similarly, in one embodiment, a processor determines whether the past tracking points were taken during the daytime or nighttime by correlating the taken tracking points to a time/date stamp on the tracking points, which is then correlated to a local sunrise/sunset database. Based on this determination/correlation, the processor is able to identify the most popular pedestrian routes according to whether it was dark or light when the tracking points were taken.

Figure 4:
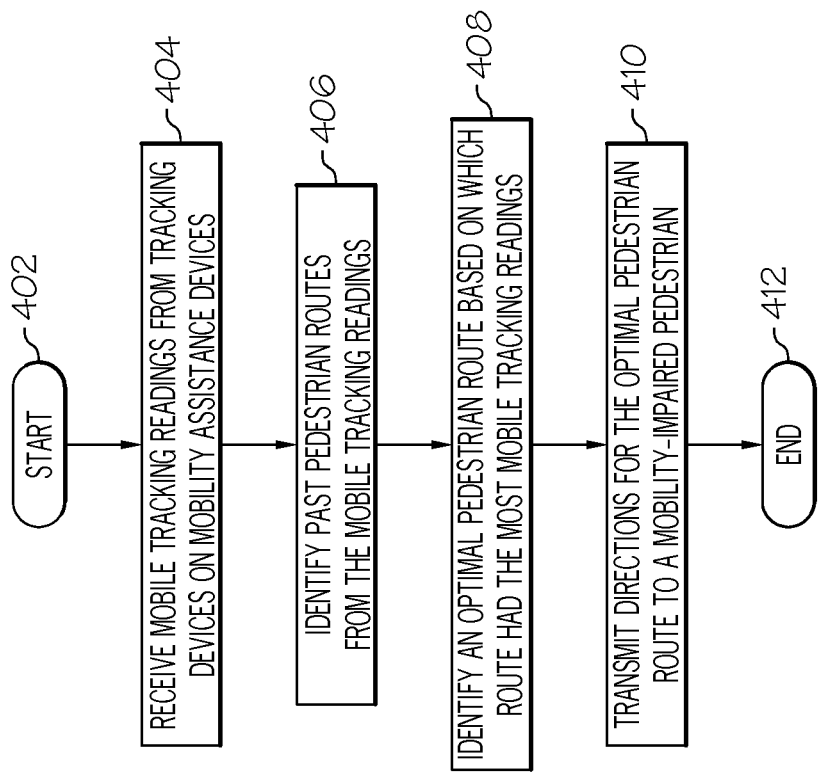
FIG. 4 is a high-level flow-chart of one or more actions performed by a processor to direct a mobility-impaired pedestrian to an optimal pedestrian route to a desired destination.

With reference now to FIG. 4, a high-level flow-chart of one or more actions performed by a processor to direct a mobility-impaired pedestrian to an optimal pedestrian route to a desired destination is presented. After initiator block 402, a processor receives a plurality of mobile tracking readings from each of multiple mobility assistance devices (block 404). That is, a computer system (such as computer 102 shown in FIG. 1) receives periodic or continuous tracking signals from the tracking device that is affixed to each mobility assistance device. This results in the identification of multiple pedestrian routes from a starting position to a desired destination (block 406), such as those depicted in FIG. 3. As described herein, these pedestrian routes are identified by the mobile tracking readings that have been generated in the past by tracking devices that are affixed to the mobility assistance devices (e.g., wheelchairs, crutches, canes, etc.). Note that in one embodiment, the tracking devices are simply worn or carried by mobility-impaired pedestrians. For example, the tracking devices may be incorporated into a smart phone being carried by mobility-impaired pedestrians, thus enabling the capture of preferred routes by pedestrians whose mobility-impairment is emotional rather than physical (and thus there is an absence of a mobility assistance device such as a wheelchair, cane, etc.). Note that in one embodiment, if tracking histories are skewed by large recurring events (such as athletic events), then any mobile tracking readings that were taken during these recurring public events (or even a single event that would skew the route history) will be eliminated from the mobile tracking readings, in order to provide a more accurate route usage history. That is, in one embodiment a processor correlates when the mobile tracking readings were taken to a database that describes recurring public events. Thus, if a time/date stamp on a particular set of mobile tracking readings correlates to a time/date of a recurring public event, then there is an association of the recurring public event and the mobile tracking readings that were taken during such a recurring public event.

In one embodiment, the determination of the optimal pedestrian route may include locating and identifying an elevator, which if not on a route, will eliminate that route as a possible candidate for the optimal pedestrian route for a particular mobility-impaired pedestrian. For example, assume that a mobility-impaired pedestrian is in a wheelchair, and desires to get to the third floor of a parking facility. If there is no elevator in the parking facility, then that mobility-impaired pedestrian will be required to roll uphill on the parking facility ramps, which is may be physically exhausting, if not physically impossible, for that mobility-impaired pedestrian. In the present embodiment, an elevator is located by a processor (e.g., computer 102 in FIG. 1) detecting that a normally continuous signal from a tracking device goes silent at a same location along a pedestrian route (e.g., within the parking facility), and then reappears at a different altitude (i.e., a higher or lower floor), as indicated by an altimeter function in a GPS device associated with the tracking device. This pattern of loss of signal followed by a change in altitude indicates that past mobility-impaired pedestrians have used an elevator, in which GPS signals typically are blocked. Based on this historical pattern, the location of the elevator is determined and transmitted to the mobility-impaired pedestrian.

As described in block 408, an optimal pedestrian route is then identified for a current mobility-impaired pedestrian. The current mobility-impaired pedestrian is defined as a mobility-impaired pedestrian who is currently at an origination point A of the past pedestrian routes that have been identified, and who desires to travel to a destination point B on these past pedestrian routes. A preliminary determination is made that whichever route has been taken the most often in the past, as indicated by having more mobile tracking readings than other routes from the origination point A to the destination point B, is the optimal pedestrian route. Note that in one embodiment, a correlation is made between the mobility-impaired pedestrians whose tracking devices generated the route histories and the current mobility-impaired pedestrian. That is, the route taken most often in the past by persons with a same mobility-impairment as the current mobility-impaired pedestrian will be deemed the optimal route for that mobility-impaired pedestrian. Thus, a recommendation will be made to person in a wheelchair to follow the route most often taken by other wheelchair-using pedestrians, while a visually impaired pedestrian will be advised to follow the most popular route taken by other visually impaired pedestrians in the past (all as indicated by the tracking history generated by the tracking devices associated with the past pedestrians). Stated another way, a specific mobility-impairment affecting a specific type of user of one of the multiple mobility assistance devices that provided past mobile tracking readings is identified. A type-specific pedestrian route is then generated for mobility-impaired pedestrians having that same specific mobility-impairment. After a processor identifies which mobility-impairment affects the current mobility-impaired pedestrian, and then matches the mobility-impairment of the current mobility-impaired pedestrian to the specific mobility-impairment affecting the specific type of user of one of the multiple mobility assistance devices that provided past mobile tracking readings.

As indicated above, certain pedestrian routes are deemed optimal according to current conditions surrounding the current mobility-impaired pedestrian who is in need of route advice. For example, a route that was most popular, particularly with mobility-impaired pedestrians having a same mobility impairment as the current mobility-impaired pedestrian, during certain weather conditions, time of day or night, time of year, etc., will be recommended to the current mobility-impaired pedestrian. Similarly, if the current mobility-impaired pedestrian wants to get to a venue where a recurring public event is occurring (e.g., a college athletic game), whichever route was preferred in the past by those having his same mobility impairment will be recommended to that current mobility-impaired pedestrian.

As indicated in block 410 of FIG. 4, once the optimal pedestrian route is determined (based on the highest past usage) for the current mobility-impaired pedestrian, directions that describe this identified optimal pedestrian route are transmitted to the current mobility-impaired pedestrian (e.g., to his smart phone, personal digital assistant (PDA), etc.). The process ends at terminator block 412.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A processor-implemented method of guiding mobility-impaired pedestrians, the processor-implemented method comprising:

a processor receiving a plurality of mobile tracking readings from each of multiple mobility assistance devices, wherein a tracking device is affixed to each of the multiple mobility assistance devices to generate the plurality of mobile tracking readings;

the processor identifying a plurality of pedestrian routes taken by the multiple mobility assistance devices to a desired destination, wherein the plurality of pedestrian routes are identified by the plurality of mobile tracking readings generated by tracking devices affixed to the multiple mobility assistance devices;

the processor identifying multiple optimal pedestrian routes from the plurality of pedestrian routes, wherein said multiple optimal pedestrian routes are identified as having more mobile tracking readings than other pedestrian routes from the plurality of pedestrian routes;

the processor associating a first local weather condition to times during which mobile tracking readings were taken for a first optimal pedestrian route, wherein the first optimal pedestrian route is from the multiple optimal pedestrian routes;

the processor associating a second local weather condition to times during which mobile tracking readings were taken for a second optimal pedestrian route, wherein the second optimal pedestrian route is from the multiple optimal pedestrian routes;

the processor identifying a real-time local weather condition for a current mobility-impaired pedestrian traveling to the desired destination;

the processor, in response to determining that the first local weather condition and the real-time local weather condition are substantially similar, selecting the first optimal pedestrian route over the second optimal pedestrian route for transmission to the current mobility-impaired pedestrian; and the processor transmitting directions that describe said first optimal pedestrian route, to the desired destination, to the current mobility-impaired pedestrian for traveling to the desired destination.

2. The processor-implemented method of claim 1, further comprising:

the processor associating a first time of day during which mobile tracking readings were taken for the first optimal pedestrian route;

the processor associating a second time of day during which mobile tracking readings were taken for the second optimal pedestrian route;

the processor identifying a current time of day for the current mobility-impaired pedestrian traveling to the desired destination;

the processor, in response to determining that the second time of day and the current time of day are substantially similar, selecting the second optimal pedestrian route for transmission to the current mobility-impaired pedestrian.

3. The processor-implemented method of claim 1, further comprising:

the processor detecting a change in altitude location of at least one of the multiple mobility assistance devices after losing and then subsequently regaining a signal from the tracking device on said at least one of the multiple mobility assistance devices;

the processor interpreting said change in altitude location after losing and then subsequently regaining said signal from the tracking device as being caused by said at least one of the multiple mobility assistance devices being transported in an elevator; and the processor transmitting a location of said elevator to said current mobility-impaired pedestrian.

4. The processor-implemented method of claim 1, further comprising:

the processor identifying occurrences of a recurring public event; and the processor eliminating any mobile tracking readings that were taken during the recurring public event when identifying the plurality of pedestrian routes.

5. The processor-implemented method of claim 1, further comprising:

the processor identifying a specific mobility-impairment affecting a specific type of user of one of said multiple mobility assistance devices that provided past mobile tracking readings;

the processor generating a type-specific pedestrian route for mobility-impaired pedestrians having said specific mobility-impairment, wherein said type-specific pedestrian route is generated from past mobile tracking readings for said specific type of user;

the processor identifying a mobility-impairment of said current mobility-impaired pedestrian; and the processor, in response to matching the mobility-impairment of said current mobility-impaired pedestrian to the specific mobility-impairment affecting the specific type of user of one of said multiple mobility assistance devices that provided past mobile tracking readings, transmitting the type-specific pedestrian route to the current mobility-impaired pedestrian.

6. A computer program product for guiding mobility-impaired pedestrians, the computer program product comprising:

a non-transitory computer readable storage media;

first program instructions to receive a plurality of mobile tracking readings from each of multiple mobility assistance devices, wherein a tracking device is affixed to each of the multiple mobility assistance devices to generate the plurality of mobile tracking readings;

second program instructions to identify a plurality of pedestrian routes taken by the multiple mobility assistance devices to a desired destination, wherein the plurality of pedestrian routes are identified by the plurality of mobile tracking readings generated by tracking devices affixed to the multiple mobility assistance devices;

third program instructions to identify multiple optimal pedestrian routes from the plurality of pedestrian routes, wherein said multiple optimal pedestrian routes are identified as having more mobile tracking readings than other pedestrian routes from the plurality of pedestrian routes; and fourth program instructions to associate a first time of day during which mobile tracking readings were taken for a first optimal pedestrian route, wherein the first optimal pedestrian route is from the multiple optimal pedestrian routes;

fifth program instructions to associate a second time of day during which mobile tracking readings were taken for a second optimal pedestrian route, wherein the second optimal pedestrian route is from the multiple optimal pedestrian routes;

sixth program instructions to identify a current time of day for a current mobility-impaired pedestrian traveling to the desired destination;

seventh program instructions to, in response to determining that the first time of day and the current time of day are substantially similar, select the first optimal pedestrian route for transmission to the current mobility-impaired pedestrian; and wherein the first, second, third, fourth, and fifth, sixth, and seventh program instructions are stored on the non-transitory computer readable storage media.

7. The computer program product of claim 6, further comprising:

eighth program instructions to associate a first local weather condition to times during which mobile tracking readings were taken for a first optimal pedestrian route, wherein the first optimal pedestrian route is from the multiple optimal pedestrian routes;

ninth program instructions to associate a second local weather condition to times during which mobile tracking readings were taken for a second optimal pedestrian route, wherein the second optimal pedestrian route is from the multiple optimal pedestrian routes;

tenth program instructions to identify a real-time local weather condition for the current mobility-impaired pedestrian traveling to the desired destination; and eleventh program instructions to, in response to determining that the second local weather condition and the real-time local weather condition are substantially similar, select the second optimal pedestrian route for transmission to the current mobility-impaired pedestrian; and wherein the eighth, ninth, tenth, and eleventh program instructions are stored on the non-transitory computer readable storage media.

8. The computer program product of claim 6, further comprising:

eighth program instructions to detect a change in altitude location of at least one of the multiple mobility assistance devices after losing and then subsequently regaining a signal from the tracking device on said at least one of the multiple mobility assistance devices;

ninth program instructions to interpret said change in altitude location after losing and then subsequently regaining said signal from the tracking device as being caused by said at least one of the multiple mobility assistance devices being transported in an elevator; and tenth program instructions to transmit a location of said elevator to said current mobility-impaired pedestrian; and wherein the eighth, ninth, and tenth program instructions are stored on the non-transitory computer readable storage media.

9. The computer program product of claim 6, further comprising:

eighth program instructions to identify occurrences of a recurring public event; and ninth program instructions to eliminate any mobile tracking readings that were taken during the recurring public event when identifying the plurality of pedestrian routes; and wherein the eighth and ninth program instructions are stored on the computer readable storage media.

10. The computer program product of claim 6, further comprising:

eighth program instructions to identify a specific mobility-impairment affecting a specific type of user of one of said multiple mobility assistance devices that provided past mobile tracking readings;

ninth program instructions to generate a type-specific pedestrian route for mobility-impaired pedestrians having said specific mobility-impairment, wherein said type-specific pedestrian route is generated from past mobile tracking readings for said specific type of user;

tenth program instructions to identify a mobility-impairment of said current mobility-impaired pedestrian; and eleventh program instructions to, in response to matching the mobility-impairment of said current mobility-impaired pedestrian to the specific mobility-impairment affecting the specific type of user of one of said multiple mobility assistance devices that provided past mobile tracking readings, transmit the type-specific pedestrian route to the current mobility-impaired pedestrian; and wherein the eighth, ninth, tenth, and eleventh program instructions are stored on the non-transitory computer readable storage media.

11. A computer system comprising:

a processor, a computer readable memory, and a non-transitory computer readable storage media;

first program instructions to receive a plurality of mobile tracking readings from each of multiple mobility assistance devices, wherein a tracking device is affixed to each of the multiple mobility assistance devices to generate the plurality of mobile tracking readings;

second program instructions to identify a plurality of pedestrian routes taken by the multiple mobility assistance devices to a desired destination, wherein the plurality of pedestrian routes are identified by the plurality of mobile tracking readings generated by tracking devices affixed to the multiple mobility assistance devices;

third program instructions to identify multiple optimal pedestrian routes from the plurality of pedestrian routes, wherein said multiple pedestrian routes are identified as having more mobile tracking readings than other pedestrian routes from the plurality of pedestrian routes;

fourth program instructions to identify a specific mobility-impairment affecting a specific type of user of one of said multiple mobility assistance devices that provided past mobile tracking readings;

fifth program instructions to generate a type-specific pedestrian route for mobility-impaired pedestrians having said specific mobility-impairment, wherein the type-specific pedestrian route is from the multiple optimal pedestrian routes, and wherein said type-specific pedestrian route is generated from past mobile tracking readings for said specific type of user;

sixth program instructions to identify a mobility-impairment of said current mobility-impaired pedestrian; and seventh program instructions to, in response to matching the mobility-impairment of said current mobility-impaired pedestrian to the specific mobility-impairment affecting the specific type of user of one of said multiple mobility assistance devices that provided past mobile tracking readings, transmit the type-specific pedestrian route to the current mobility-impaired pedestrian; and wherein the first, second, third, fourth, fifth, sixth, and seventh program instructions are stored on the non-transitory computer readable storage media for execution by the processor via the computer readable memory.

12. The computer system of claim 11, further comprising:

eighth program instructions to detect a change in altitude location of at least one of the multiple mobility assistance devices after losing and then subsequently regaining a signal from the tracking device on said at least one of the multiple mobility assistance devices;

ninth program instructions to interpret said change in altitude location after losing and then subsequently regaining said signal from the tracking device as being caused by said at least one of the multiple mobility assistance devices being transported in an elevator; and tenth program instructions to transmit a location of said elevator to said current mobility-impaired pedestrian; and wherein the eighth, ninth, and tenth program instructions are stored on the non-transitory computer readable storage media for execution by the processor via the computer readable memory.

13. The computer system of claim 11, further comprising:

eighth program instructions to identify occurrences of a recurring public event; and ninth program instructions to eliminate any mobile tracking readings that were taken during the recurring public event when identifying the plurality of pedestrian routes; and wherein the eighth and ninth program instructions are stored on the non-transitory computer readable storage media for execution by the processor via the computer readable memory.

* * * * *